United States Patent
Chen et al.

(10) Patent No.: US 11,496,239 B2
(45) Date of Patent: Nov. 8, 2022

(54) CHANNEL QUALITY INDICATOR INFORMATION TRANSMISSION AND RECEPTION

(71) Applicant: ZTE Corporation, Guangdong (CN)

(72) Inventors: Mengzhu Chen, Guangdong (CN); Liguang Li, Guangdong (CN); Luanjian Bian, Guangdong (CN); Jin Xu, Guangdong (CN); Jun Xu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 151 days.

(21) Appl. No.: 17/038,683

(22) Filed: Sep. 30, 2020

(65) Prior Publication Data

US 2021/0013995 A1    Jan. 14, 2021

Related U.S. Application Data

(63) Continuation of application No. PCT/CN2018/082021, filed on Apr. 4, 2018.

(51) Int. Cl.
    *H04W 72/04*   (2009.01)
    *H04L 1/00*    (2006.01)
    *H04L 27/36*   (2006.01)

(52) U.S. Cl.
    CPC .......... *H04L 1/0026* (2013.01); *H04L 1/0003* (2013.01); *H04L 1/0016* (2013.01); *H04L 27/362* (2013.01)

(58) Field of Classification Search
    CPC ... H04L 1/0026; H04L 1/0003; H04L 1/0016; H04L 27/362
    See application file for complete search history.

(56) References Cited

U.S. PATENT DOCUMENTS

2014/0071892 A1* 3/2014 Liu .................. H04L 1/007
                                                  370/328
2016/0262147 A1  9/2016 Wei et al.
(Continued)

FOREIGN PATENT DOCUMENTS

CN         106063214 A       10/2016

OTHER PUBLICATIONS

SAMSUNG "Design of CQI table for URLLC" 3GPP TS G RAN WG 1 Meeting #92, R1-1801999, Mar. 2, 2018, 5 pages (Year: 2018).*

(Continued)

*Primary Examiner* — Lan-Huong Truong
(74) *Attorney, Agent, or Firm* — Perkins Coie LLP (57) ABSTRACT

Described are methods, systems and devices for the transmission and reception of channel quality indicator (CQI) information over an physical channel to facilitate, for example, meeting block error rate requirements in emerging systems. One example method includes transmitting an index associated with a quality of the physical channel, where the index corresponds to an entry in a parameter table set. Another example method includes receiving an index associated with the quality of the downlink physical channel, and transmitting a plurality of data blocks, where contents of the plurality of data blocks are encoded and modulated using a code rate and a modulation scheme, respectively, which are selected from an entry in the parameter tables corresponding to the index. In both exemplary methods, one or more parameter tables include at least three entries comprising code rates having values less than or equal to 120/1024.

22 Claims, 11 Drawing Sheets (56) References Cited

U.S. PATENT DOCUMENTS

2019/0305911 A1* 10/2019 Sarkis ................... H04L 5/0048
2020/0077414 A1* 3/2020 Ye ......................... H04L 1/0013
2021/0021316 A1* 1/2021 Bai ....................... H04B 17/336

OTHER PUBLICATIONS

International Search Report and Written Opinion, PCT/CN2018/082021 dated Jan. 4, 2019, 9 pages.
QUALCOMM Incorporated "Considerations for CQI and MCS forURLLC" 3GPP TS G-RAN WG1, #92, R1-1802851, Mar. 2, 2018, 5 pages.
SAMSUNG "Design of CQI table for URLLC" 3GPP TS G RAN WG 1 Meeting #92, R1-1801 999, Mar. 2, 2018, 5 pages.

\* cited by examiner

FIG. 1

| CQI index | modulation | code rate x 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 2

| CQI index | modulation | code rate x 1024 | efficiency |
|---|---|---|---|
| 11 | QPSK | 177 | |
| 12 | QPSK | 292 | |
| 13 | QPSK | 433 | |
| 14 | QPSK | 586 | ...... |
| 15 | 16QAM | 362 | |
| 16 | 16QAM | 474 | |
| 17 | 16QAM | 600 | |
| 18 | 64QAM | 450 | |
| 19 | 64QAM | 551 | |

FIG. 3

| CQI index | modulation | code rate x 1024 | efficiency |
|---|---|---|---|
| i1 | QPSK | | 0.34575 |
| i2 | QPSK | | 0.57035 |
| i3 | QPSK | | 0.84575 |
| i4 | QPSK | | 1.14455 |
| i5 | 16QAM | | 1.44535 |
| i6 | 16QAM | | 1.88285 |
| i7 | 16QAM | | 2.37505 |
| i8 | 64QAM | | 2.69925 |
| i9 | 64QAM | | 3.29105 |

FIG. 4

| CQI index for CQI Table I | CQI index for CQI Table II | modulation | code rate x 1024 | efficiency |
|---|---|---|---|---|
| 0 | 0 | out of range | | |
| N/A | 1 | QPSK | 32 | 0.0625 |
| 1 | 2 | QPSK | 50 | 0.0977 |
| 2 | 3 | QPSK | 78 | 0.1523 |
| 3 | 4 | QPSK | 120 | 0.2344 |
| 4 | 5 | QPSK | 193 | 0.3770 |
| 5 | 6 | QPSK | 308 | 0.6016 |
| 6 | 7 | QPSK | 449 | 0.8770 |
| 7 | 8 | QPSK | 602 | 1.1758 |
| 8 | 9 | 16QAM | 378 | 1.4766 |
| 9 | 10 | 16QAM | 490 | 1.9141 |
| 10 | 11 | 16QAM | 616 | 2.4063 |
| 11 | 12 | 64QAM | 466 | 2.7305 |
| 12 | 13 | 64QAM | 567 | 3.3223 |
| 13 | 14 | 64QAM | 666 | 3.9023 |
| 14 | 15 | 64QAM | 772 | 4.5234 |
| 15 | N/A | 64QAM | 873 | 5.1152 |

FIG. 5A

| CQI index for CQI Table I | CQI index for CQI Table II | modulation | code rate x 1024 | efficiency |
|---|---|---|---|---|
| 0 | 0 | out of range | | |
| N/A | 1 | QPSK | 32 | 0.0625 |
| 2 | 2 | QPSK | 50 | 0.0977 |
| 3 | 3 | QPSK | 78 | 0.1523 |
| 4 | 4 | QPSK | 120 | 0.2344 |
| 5 | 5 | QPSK | 193 | 0.3770 |
| 6 | 6 | QPSK | 308 | 0.6016 |
| 7 | 7 | QPSK | 449 | 0.8770 |
| 8 | 8 | QPSK | 602 | 1.1758 |
| 9 | 9 | 16QAM | 378 | 1.4766 |
| 10 | 10 | 16QAM | 490 | 1.9141 |
| 11 | 11 | 16QAM | 616 | 2.4063 |
| 12 | 12 | 64QAM | 466 | 2.7305 |
| 13 | 13 | 64QAM | 567 | 3.3223 |
| 14 | 14 | 64QAM | 666 | 3.9023 |
| 15 | 15 | 64QAM | 772 | 4.5234 |
| 1 | N/A | 64QAM | 873 | 5.1152 |

FIG. 5B

| CQI index for CQI Table I | CQI index for CQI Table II | modulation | code rate x 1024 | efficiency |
|---|---|---|---|---|
| 0 | 0 | out of range | | |
| N/A | 1 | QPSK | R1*1024 | R1*2 |
| N/A | 2 | QPSK | r1*1024 | r1*2 |
| 1 | 3 | QPSK | 78 | 0.1523 |
| 2 | 4 | QPSK | 120 | 0.2344 |
| 3 | 5 | QPSK | 193 | 0.3770 |
| 4 | 6 | QPSK | 308 | 0.6016 |
| 5 | 7 | QPSK | 449 | 0.8770 |
| 6 | 8 | QPSK | 602 | 1.1758 |
| 7 | 9 | 16QAM | 378 | 1.4766 |
| 8 | 10 | 16QAM | 490 | 1.9141 |
| 9 | 11 | 16QAM | 616 | 2.4063 |
| 10 | 12 | 64QAM | 466 | 2.7305 |
| 11 | 13 | 64QAM | 567 | 3.3223 |
| 12 | 14 | 64QAM | 666 | 3.9023 |
| 13 | N/A | 64QAM | 772 | 4.5234 |
| 14 | 15 | 64QAM | 873 | 5.1152 |
| 15 | N/A | 64QAM | 948 | 5.5547 |

FIG. 6A

| CQI index for CQI Table I | CQI index for CQI Table II | modulation | code rate x 1024 | efficiency |
|---|---|---|---|---|
| 0 | 0 | \multicolumn{3}{c}{out of range} | | |
| N/A | 14 | QPSK | R1*1024 | R1*2 |
| N/A | 15 | QPSK | r1*1024 | r1*2 |
| 1 | 1 | QPSK | 78 | 0.1523 |
| 2 | 2 | QPSK | 120 | 0.2344 |
| 3 | 3 | QPSK | 193 | 0.3770 |
| 4 | 4 | QPSK | 308 | 0.6016 |
| 5 | 5 | QPSK | 449 | 0.8770 |
| 6 | 6 | QPSK | 602 | 1.1758 |
| 7 | 7 | 16QAM | 378 | 1.4766 |
| 8 | 8 | 16QAM | 490 | 1.9141 |
| 9 | 9 | 16QAM | 616 | 2.4063 |
| 10 | 10 | 64QAM | 466 | 2.7305 |
| 11 | 11 | 64QAM | 567 | 3.3223 |
| 12 | 12 | 64QAM | 666 | 3.9023 |
| 13 | N/A | 64QAM | 772 | 4.5234 |
| 14 | 13 | 64QAM | 873 | 5.1152 |
| 15 | N/A | 64QAM | 948 | 5.5547 |

CHANNEL QUALITY INDICATOR INFORMATION TRANSMISSION AND RECEPTION

CROSS REFERENCE TO RELATED APPLICATIONS

This patent document is a continuation of and claims benefit of priority to International Patent Application No. PCT/CN2018/082021, filed on Apr. 4, 2018. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology have led to greater demand for capacity and connectivity. Other aspects, such as energy consumption, device cost, spectral efficiency, and latency are also important in meeting the needs of various communication scenarios. In comparison with existing wireless networks, next generation systems and wireless communication techniques need to provide adaptable waveforms that can handle time-varying fading channel conditions and interference from a greater number of users.

SUMMARY

This document relates to methods, systems, and devices for the transmission and reception of channel quality indication (CQI) information. The CQI table is an aspect of the implementation of adaptive coded modulation techniques that is used to ensure that data transmissions can meet a corresponding block error rate requirement.

In one exemplary aspect, a wireless communication method is disclosed. The method, which may be implemented at a wireless device (e.g. user equipment), includes transmitting, over an uplink physical channel, an index associated with a quality of the downlink physical channel, where the index corresponds to an entry in a parameter table, of a parameter table set, that includes a modulation scheme, a code rate and an efficiency associated with the index, and where one or more parameter tables of the parameter table set comprise at least three entries comprising code rates having values less than or equal to 120/1024.

In another exemplary aspect, a wireless communication method is disclosed. The method, which may be implemented at a network node (e.g. a base station, an eNB, or a gNB), includes receiving, over an uplink physical channel, an index associated with a quality of the downlink physical channel, and transmitting a plurality of data blocks, where contents of the plurality of data blocks are generated using a block size and a modulation scheme, which correspond to an entry associated with the index in a parameter table, of a parameter table set, wherein the entry may also include an efficiency, and where one or more parameter tables of the parameter table set comprise at least three entries comprising code rates having values less than or equal to 120/1024.

In yet another exemplary aspect, the above-described methods are embodied in the form of processor-executable code and stored in a computer-readable program medium.

In yet another exemplary embodiment, a device that is configured or operable to perform the above-described methods is disclosed. The device may include a processor that is programmed to implement these methods.

The above and other aspects and their implementations are described in greater detail in the drawings, the descriptions, and the claims.

DETAILED DESCRIPTION

A mobile communication system, due to the time-varying characteristics of wireless fading channels, may adaptively adjust its transmission power, modulation and coding schemes, and data frame length according to the instantaneous channel state to overcome the time-varying characteristics of the channel to obtain the best possible performance. This mechanism is referred to as adaptive coding modulation, and is part of most current link adaptation technologies.

The channel quality indicator (CQI) is one part of the physical channel state information (CSI). The CQI table is an important part of the implementation of adaptive coded modulation techniques. After performing channel estimation, a wireless device (e.g. a user equipment (UE), or terminal) reports the CQI to a network node (e.g. the base station (BS), or gNB), and the base station selects an appropriate modulation and coding scheme (MCS) and transport block size according to the CQI information, so as to ensure that the transport block can meet a corresponding block error rate requirement. Current CQI tables do not meet the requirements of New Radio (NR) systems. The techniques described in the present document may be embodied in implementations that overcome such limitations of current CQI tables, among other features.

Figure 1:
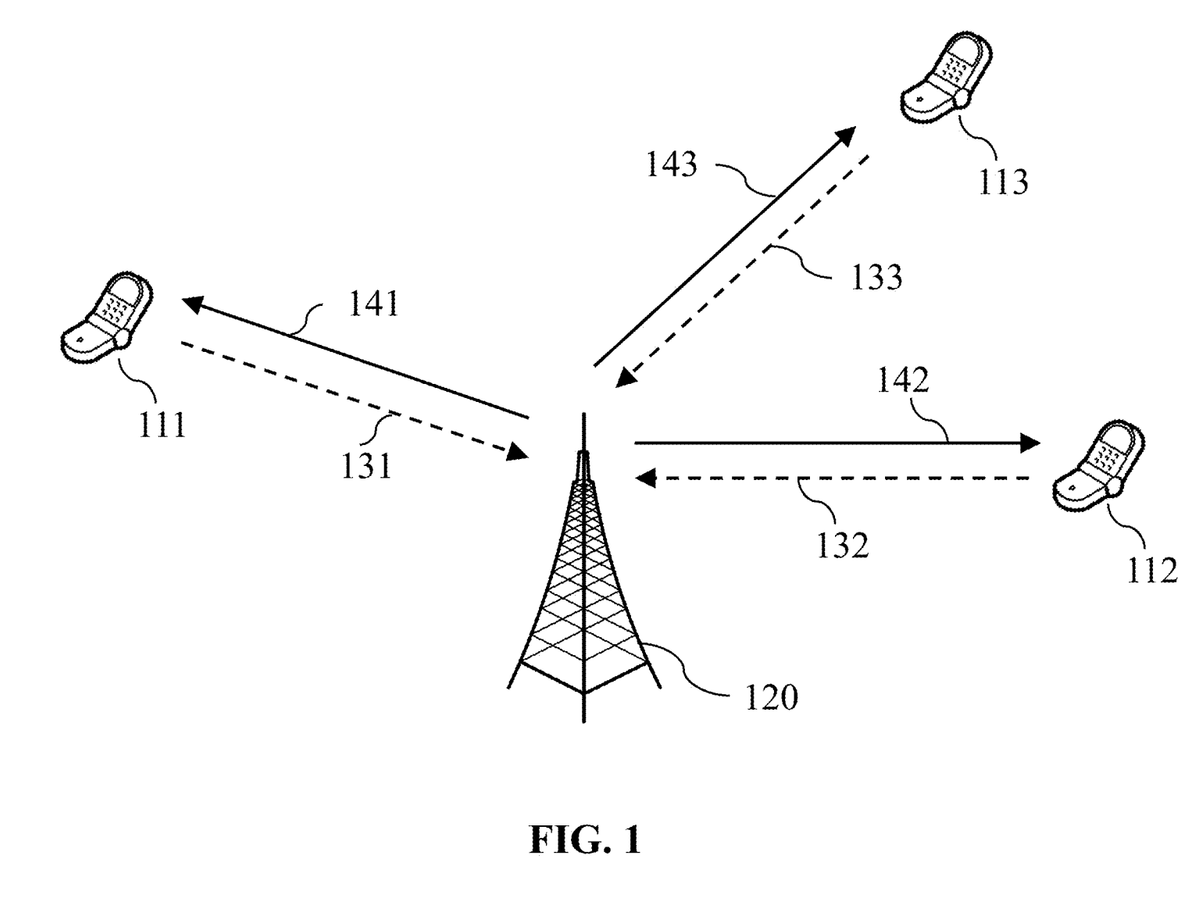
FIG. 1 shows an example of a base station (BS) and user equipment (UE) in wireless communication, in accordance with some embodiments of the presently disclosed technology.

FIG. 1 shows an example of a wireless communication system that includes a BS 120 and one or more user equipment (UE) 111, 112 and 113. In some embodiments, the UEs may report the CQI (131, 132, 133) to the BS. For each of the reported CQIs, the BS may refer to an MCS (modulation and coding scheme) table to determine a modulation scheme and code rate corresponding to that CQI index, and subsequently transmit data blocks (141, 142, 143) to the UEs, using the modulation scheme and the code rate for the respective UE. The UE may be, for example, a smartphone, a tablet, a mobile computer, a machine to machine (M2M) device, an Internet of Things (IoT) device, and so on.

The current version of the upcoming New Radio enhanced mobile broadband (NR-eMBB) standard uses the same CQI table as was specified in the Long Term Evolution (LTE) standard. Due to the low NR-URLLC (Ultra-Reliable and Low Latency Communication) latency (e.g. the user plane delay may be less than 1 ms) and high reliability (e.g. the block error rate (BLER) requirement may be $\leq 1e^{-5}$) requirements, the existing CQI table may not be sufficient. Embodiments of the disclosed technology are not limited to NR-URLLC, and may be applicable to other systems and operating modes.

Figure 2:
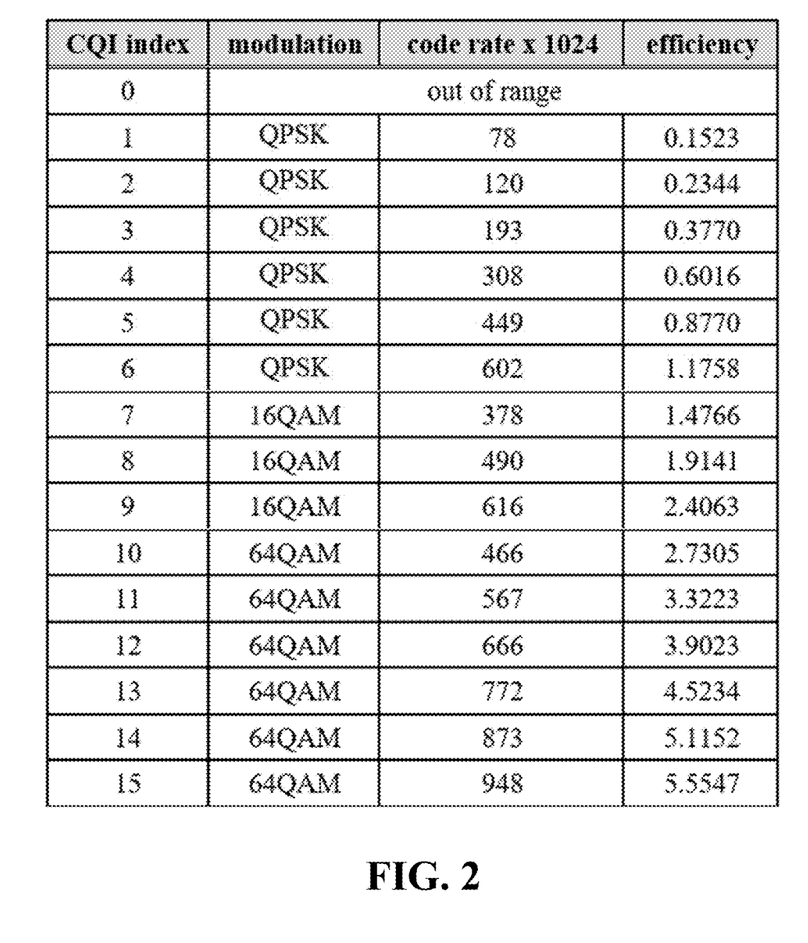
FIG. 2 shows an example of a 4-bit CQI table with modulation schemes up to 64-QAM (Quadrature Amplitude Modulation).

FIG. 2 shows an example CQI table. As shown in the table of FIG. 2, the CQI may be represented by integer values from 0 to 15, which respectively represent different CQI levels that correspond to different channel conditions. In the table, the digital modulation methods listed are QAM (Quadrature Amplitude Modulation) and QPSK (Quadrature Phase Shift Keying). Furthermore, the tabulated spectral efficiency (or simply "efficiency") is defined as the product of the code rate and the modulation order. For QPSK, 16-QAM and 64-QAM modulation methods, the modulation orders are 2, 4 and 6, respectively. In other words, for a digital modulation scheme with $2^m$ points, the modulation order is m (m is a positive integer). The base station selects an appropriate MCS and transport block size (from a CQI table) according to the CQI information reported by the terminal, so as to ensure that the transport block can meet the corresponding block error rate requirement.

Embodiments of the disclosed technology may include one or more CQI tables (e.g. two tables), at least one of which may be defined as described herein. As described in the context of FIG. 1, an entry in the CQI table may include a CQI index and a corresponding modulation scheme, code rate, and efficiency (with efficiency=code rate×modulation order). Section headings are used in the present document to improve readability of the description and do not in any way limit the discussion or the embodiments to the respective sections only.

In some embodiments, a UE or terminal may support more than one scenario, with each scenario requiring one or more CQI tables. The UE may need higher layer parameters from a base station (BS; eNB or gNB) to inform the UE which CQI table is to be used for CQI reporting.

In some embodiments, the UE may support eMBB and URLLC. In an example, two CQI tables with different maximum modulation orders are supported by eMBB; one is CQI Table 1 and the other is CQI Table 2. Similarly, URLLC may also support two CQI tables targeting at different BLER requirements; one is CQI Table 1, whereas the other is CQI Table 3. Two higher layer parameters, e.g. para1 and para2, may be needed to indicate which CQI table should be used by the UE.

In an example, its operation may include the following steps: (1) when para1 is in state S1_1 or para2 is in state S2_1, the UE or terminal uses CQI Table 1 for CQI reporting, (2) when para1 is in state S1_2, the UE or terminal uses CQI Table 2 for CQI reporting, and (3) when para2 is in state S2_2, the UE or terminal uses CQI Table 3 for CQI reporting.

In some embodiments, para2 has higher priority than para1, and when the higher layer parameter para1 and para2 are configured, the following rules may be followed:
(1) If para2 is in state S2_2 and para1 is in state S1_1, the UE or terminal uses CQI Table 3 for CQI reporting,
(2) If para2 is in state S2_2 and para1 is in state S1_2, the UE or terminal uses CQI Table 3 for CQI reporting, and
(3) If para2 is in state S2_1 and para1 is in state S1_2, the UE or terminal uses CQI Table 1 for CQI reporting.

Example Embodiments One

In some embodiments, a CQI table may include L1 entries with a QPSK modulation scheme and code rates R1 and R2, with R1<R2 and L1=2.

In some embodiments, a CQI tables may include L2 entries with a QPSK modulation scheme, and code rates R1, r1, r2, . . . , rn, R2, with R1<r1<r2< . . . <rn<R2, n=1, 2, 4 or 5, and L2=2+n.

In some embodiments, the lowest supported code rate may be R1.

In some embodiments, $30/1024 \leq R1 \leq 40/1024$ and R2=78/1024.

Example 1.1 defines R1 is in between 30/1024 and 34/2014, R2=78/2014, and $$r1 = \text{Operation}((R1+R2)/2) + \Delta 1,$$

where Operation may be a rounding operation, a ceiling function, or a floor function, and where $$-5/1024 \leq \Delta 1 \leq 5/1024.$$

Example 1.2 defines R1 and a corresponding range for r1 in the table below, where x in [a,b) defines a range that includes "a" but not "b," e.g. $a \leq x < b$.

| R1 | r1 |
|---|---|
| 30/1024 | [49/1024, 78/1024) |
| 31/1024 | [50/1024, 78/1024) |
| 32/1024 | [52/1024, 78/1024) |
| 33/1024 | [54/1024, 78/1024) |
| 34/1024 | [55/1024, 78/1024) |
| 35/1024 | [57/1024, 78/1024) |
| 36/1024 | [58/1024, 78/1024) |
| 37/1024 | [60/1024, 78/1024) |
| 38/1024 | [62/1024, 78/1024) |
| 39/1024 | [63/1024, 78/1024) |
| 40/1024 | [65/1024, 78/1024) |

In an example, at least one of the CQI tables may include entries with the following modulation schemes and code rates, and that correspond to the entries with the lowest spectral efficiencies: (QPSK, 30/1024), (QPSK, 50/1024) and (QPSK, 78/1024).

Example Embodiments Two

In some embodiments, a CQI table may include L4 entries that correspond to an equivalent number of entries in the table shown in FIG. 2. For example, the L4 entries in the CQI table may include modulation schemes that are identical to those in the corresponding entries in the table shown in FIG. 2, but the code rate of the L4 entries in the CQI table may differ from the code rates of the corresponding entries in the table shown in FIG. 2 by a value Δ2.

In some embodiments, a CQI table may include L4 entries that correspond to an equivalent number of entries in the table shown in FIG. 2. For example, the L4 entries in the CQI table may include modulation schemes that are identical to those in the corresponding entries in the table shown in FIG. 2, but the efficiency of the L4 entries in the CQI table may differ from the efficiency of the corresponding L4 entries in the table shown in FIG. 2 by a value Δ3.

In some embodiments, the value of Δ2 or Δ3 may be offset by δ1, where −2/1024≤δ1≤2/1024. In other embodiments, the value of δ1 may differ in different entries.

In some embodiments, the L4 entries are the majority of the entries in the CQI table. For example, L4/L11 may be no less than P1, where L11 is the total number of entries in the CQI table, and P1 may be 0.5, 0.6, 0.7, 0.8 or 0.95. Said another way, the L4 entries may constitute 50% to 95% of the entries of the CQI table.

In the context of the embodiments described above, multiple implementations for the values {Δ2 and Δ3} are possible. For example, these values may be predetermined, randomly selected, and/or selected based on a variety of factors that include, but are not limited to, other waveform parameters, channel conditions, or signaling. For example, Δ2 be $\pm 2^j/1024$ and Δ3 may be $\pm i \times 2^j/1024$, where i and j is a non-negative integers.

Figure 3:
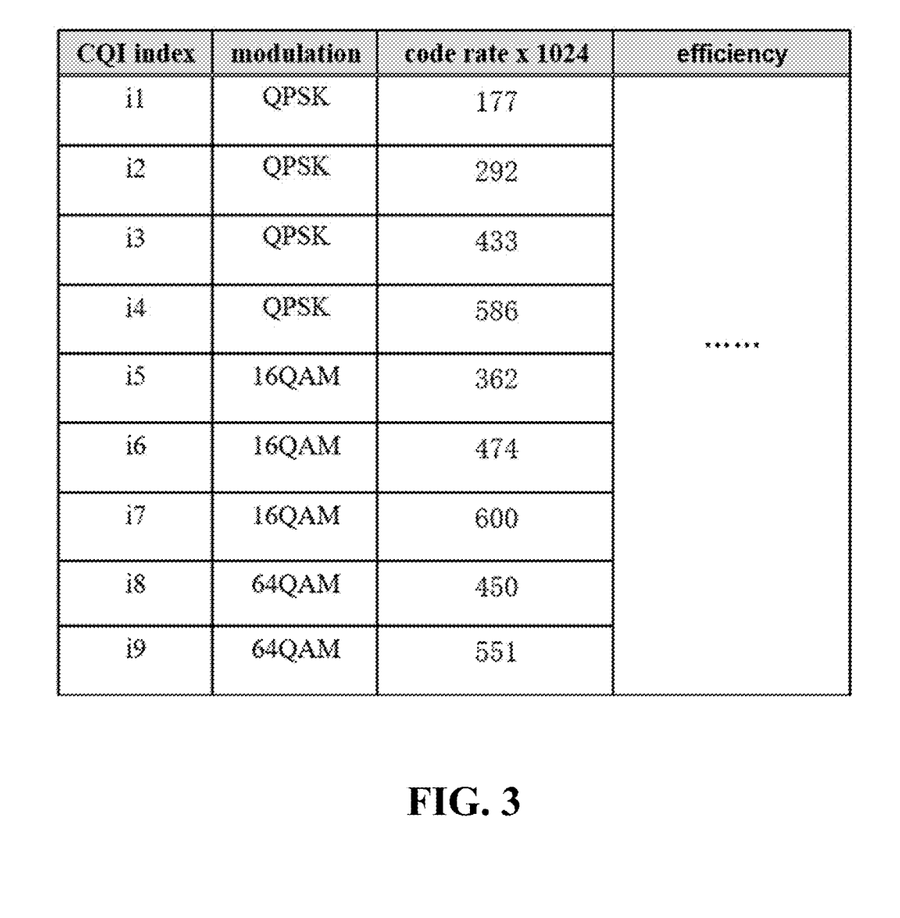
FIG. 3 shows another example of a CQI table.

Example 2.1 defines a set of entries with CQI indices I1 to I9, as shown in FIG. 3, that correspond to the entries of the table shown in FIG. 2 with CQI indices 3 to 11. In this example, the modulation schemes of the entries are identical between the two tables (in FIG. 3 and in FIG. 2), but the corresponding code rates between the two tables differ by 16/1024.

Figure 4:
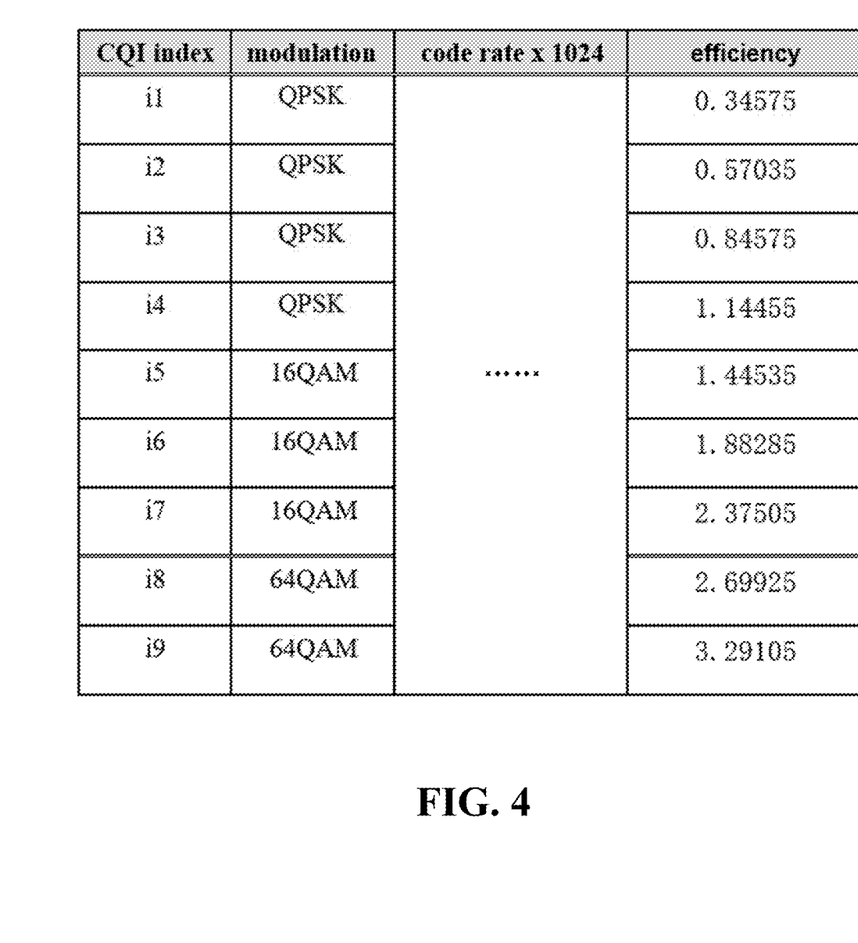
FIG. 4 shows yet another example of a CQI table.

Example 2.2 defines a set of entries with CQI indices I1 to I9, as shown in FIG. 4, that correspond to the entries of the table shown in FIG. 2 with CQI indices 3 to 11. In this example, the modulation schemes of the entries are identical between the two tables (in FIG. 4 and in FIG. 2), but the corresponding efficiencies between the two tables differ by 16/1024.

Example 2.3 defines a set of entries with CQI indices I1 to I9 that correspond to the entries of the table shown in FIG. 2 with CQI indices 3 to 11. In this example, the modulation schemes of the entries are identical between the two tables, but the corresponding efficiencies between the two tables differ by 32/1024.

Examples 2.1-2.3 show different cases wherein the code rate or the efficiency of each entry in a second table is offset from the value of the corresponding parameter in a first table. The resulting tables, shown in FIGS. 3 and 4, include " . . . " to denote entries in a dependent column that is computed based on the offset value. For example, if the code rate is offset (as in FIG. 3), then the entries in the efficiency column are computed as the product of the offset code rate and the modulation order for that entry.

Example Embodiments Three

In some embodiments, the highest modulation order for an entry in a CQI table may be 64-QAM, and the highest code rate R4 may be 666/1024 or 873/1024.

Example 3.1 defines entries in a CQI table that have the maximum spectral efficiency. For example, an entry in the CQI table corresponding to the maximum spectral efficiency has a 64-QAM modulation scheme and a code rate of 666/1024. For another example, an entry in the CQI table corresponding to the maximum spectral efficiency has a 64-QAM modulation scheme and a code rate of 873/1024. For yet another example, two entries in the CQI table corresponding to the two largest spectral efficiencies have 64-QAM modulation schemes and code rates of 666/1024 and 873/1024, respectively.

In an example, Features One through Three describe embodiments that may exist in at least a single one of the one or more CQI tables that may be used by a system to support lower code rates, higher data transmission reliability, and better coverage.

Example Embodiments Four

Current and emerging wireless systems may need to meet different requirements when serving multiple users and supporting multiple services. In some embodiments, different BLER requirements may need to be supported, which may necessitate the use of multiple CQI tables. In an example, CQI Table I may be designed for BLER1 whereas CQI Table II may be designed for BLER2, where the BLER thresholds may be 1e-1, 1e-2, 1e-3, 1e-4 or 1e-5.

In some embodiments, the CQI table set (or, more generally, the parameter table set) includes CQI table I and CQI table II, where CQI table I may include L5 entries that correspond to an equivalent number of entries in CQI table II. For example, the L5 entries in the CQI table I may include modulation schemes that are identical to those in the corresponding entries in the CQI table II, but the code rates of the L5 entries in the CQI table I may differ from the code rates of the corresponding L5 entries in CQI table II by a value Δ4.

In another example, the L5 entries in the CQI table I may include modulation schemes that are identical to those in the corresponding entries in the CQI table II, but the efficiencies of the L5 entries in the CQI table I may differ from the efficiencies of the corresponding L5 entries in CQI table II by a value Δ5.

In some embodiments, the value Δ4 or Δ5 may be offset by δ2, where −2/1024≤δ2≤2/1024. In other embodiments, the value of δ2 may differ in different entries.

In some embodiments, the L5 entries are the majority of the entries in CQI table I. For example, L5/L222 may be no less than P1, where L2 is the total number of entries in CQI table I, and P2 may be 0.5, 0.6, 0.7, 0.8 or 0.95. Said another way, the L5 entries may constitute 50% to 95% of the entries of the CQI table.

In the context of the embodiments described above, multiple implementations for the values {Δ4 and Δ5} are possible. For example, these values may be predetermined, randomly selected, and/or selected based on a variety of factors that include, but are not limited to, other waveform parameters, channel conditions, or signaling. For example, Δ4 be $\pm 2^j/1024$ and Δ5 may be $\pm i \times 2^j/1024$, where i and j is a non-negative integers.

Example Embodiments Five

As described above, supporting different requirements may necessitate the use of multiple CQI tables, and it is advantageous for the CQI indices that correspond to identical modulation schemes and code rates to themselves be identical.

Figure 5A:
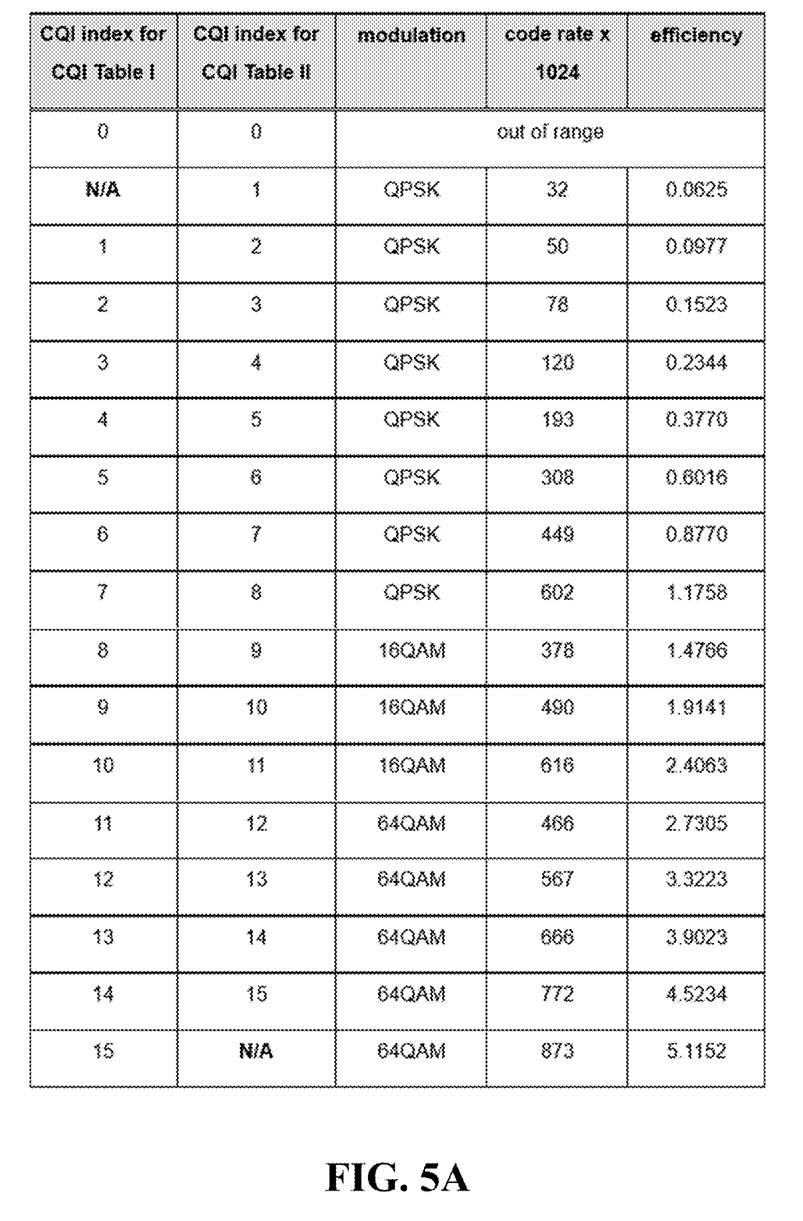
FIGS. 5A and 5B show an example of misaligned and aligned CQI tables.
Figure 5B:
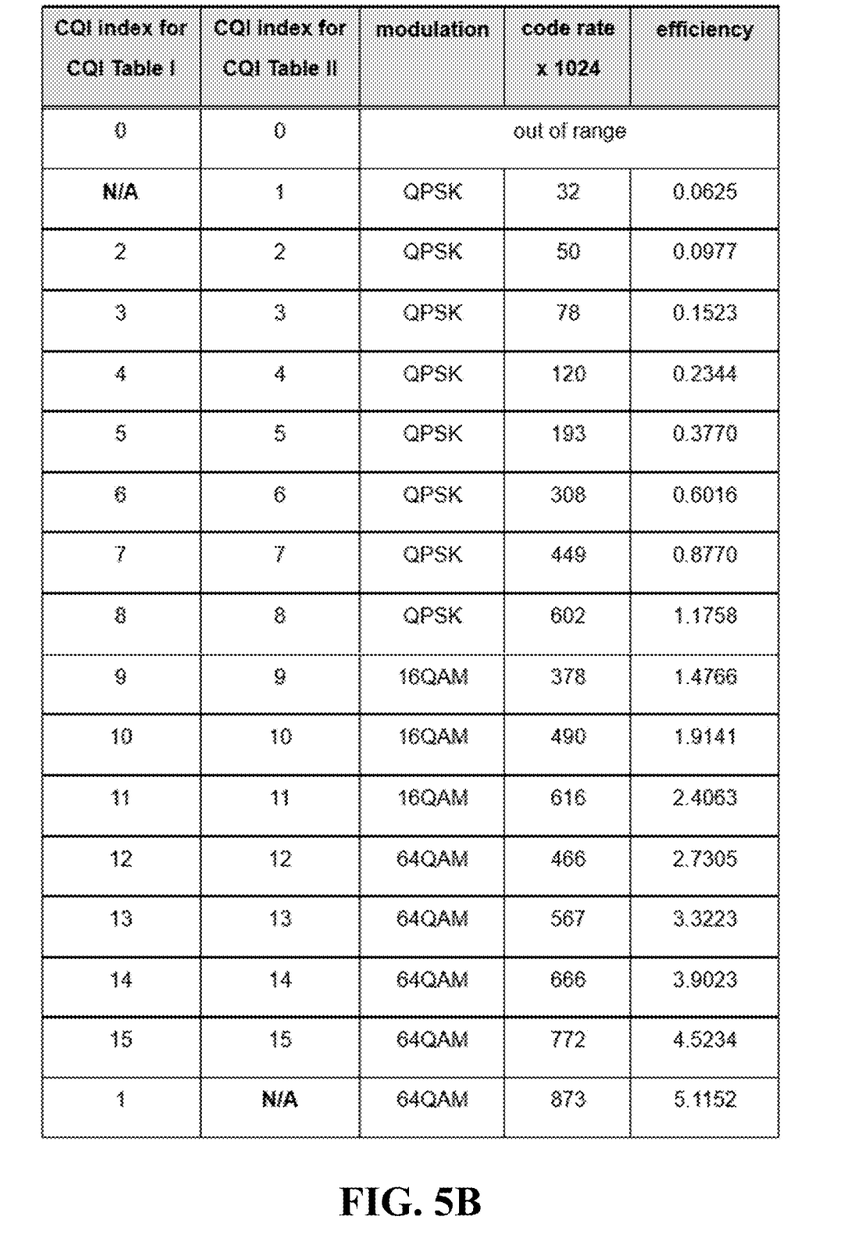

Example 5.1 defines a set of entries for two CQI tables, as shown in the tables in FIGS. 5A and 5B. For example, in the CQI table design in FIG. 5A, CQI Table I does not include the second row of the table (e.g. (modulation, code rate× 1024, efficiency)=(QPSK, 32, 0.0625)), and CQI Table II does not include the last row of the table (e.g. (modulation, code rate×1024, efficiency)=(64QAM, 873, 5.1152)). The other entries in CQI Table I and CQI Table II have modulation scheme and code rate combinations that are the same, but are associated with different CQI indices in each of the tables. For example, for (modulation, code rate×1024, efficiency)=(QPSK, 120, 0.2344), the index in CQI Table I is 3, whereas the index in CQI Table II is 4.

As may be expected, the discrepancy in the indices may cause a problem. During the period when the base station sends a signaling instruction to switch the CQI table and the terminal has not reacted to the indication signaling, the base station and the terminal have different understandings of the scheduled CQI table.

This problem may be ameliorated by use of the table shown in FIG. 5B, in which the modulation scheme and code rate combinations that are identical are assigned the same CQI index in both CQI Table I and II. As seen in FIG. 5B, even if the base station and the terminal understand the entries of the CQI table differently, the vast majority of CQI indexes in the tables are the same, thereby reducing the scheduling problem.

Figure 6A:
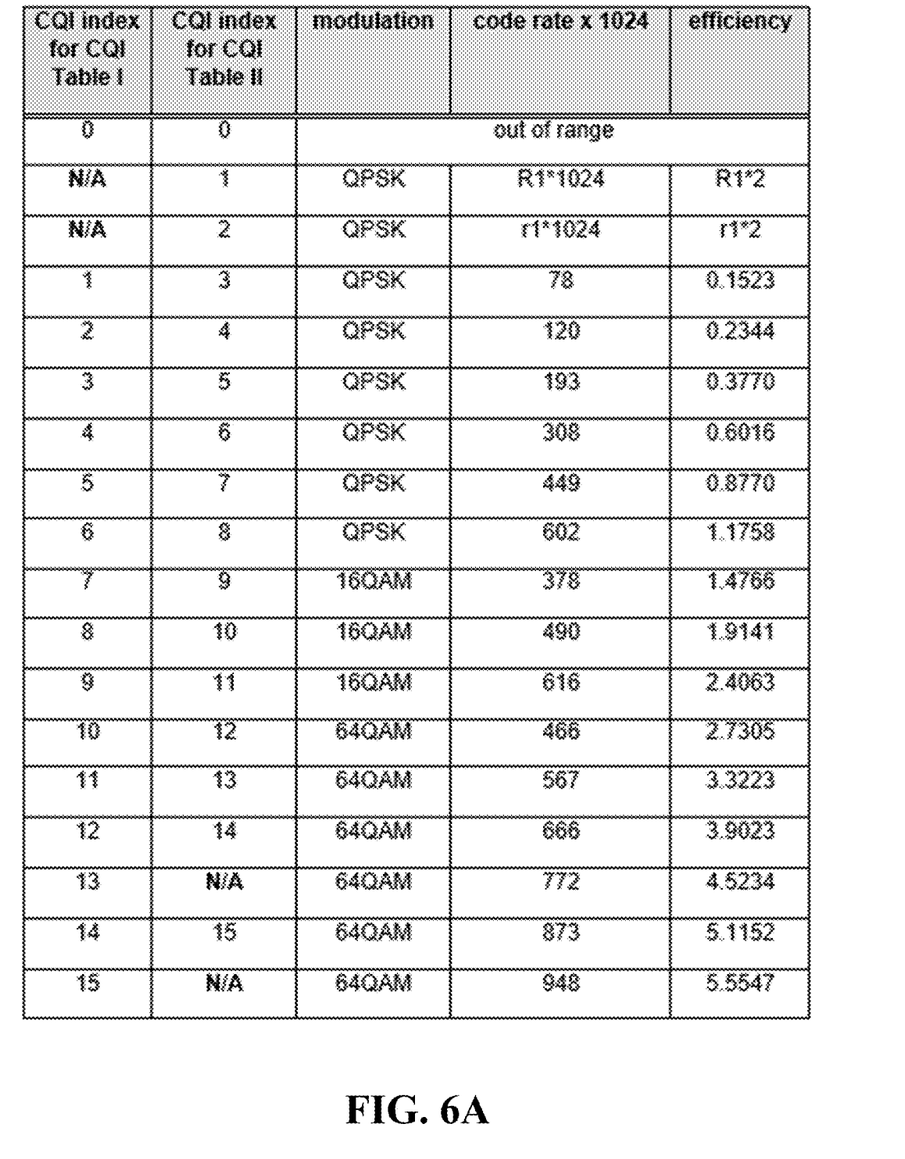
FIGS. 6A and 6B show another example of misaligned and aligned CQI tables.
Figure 6B:
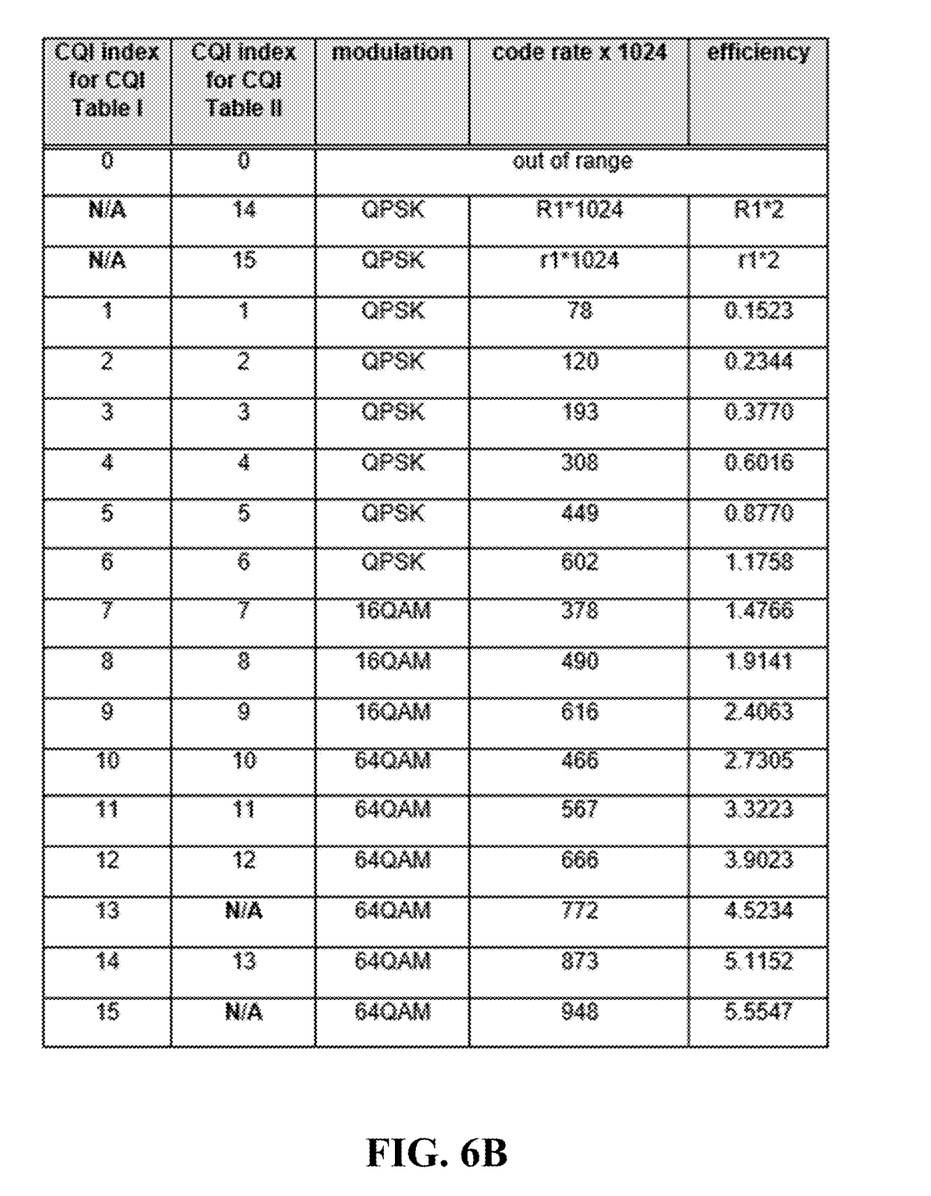

Example 5.2 is another example of two CQI tables, as shown in FIGS. 6A and 6B, that may be aligned to ensure that the vast majority of CQI indexes in the tables are the same, thereby reducing the scheduling problem. For example, in the CQI table design in FIG. 6A, CQI Table I does not include the second and third rows of the table (e.g. code rates that depend on R1 and r1, as defined in Example 1.2), and CQI Table II does not include the last and third to last rows of the table (e.g. (modulation, code rate×1024, efficiency)=(64QAM, 772, 4.5234) and (64QAM, 948, 5.5547)). The other entries in CQI Table I and CQI Table II have modulation scheme and code rate combinations that are the same, but are associated with different CQI indices in each of the tables.

And as in Example 5.1, the table shown in FIG. 6B is realigned such that the modulation scheme and code rate combinations that are identical are assigned the same CQI index in both CQI Table I and II, thereby reducing the discrepancy between the CQI tables.

Exemplary Methods for CQI Tables

Figure 7:
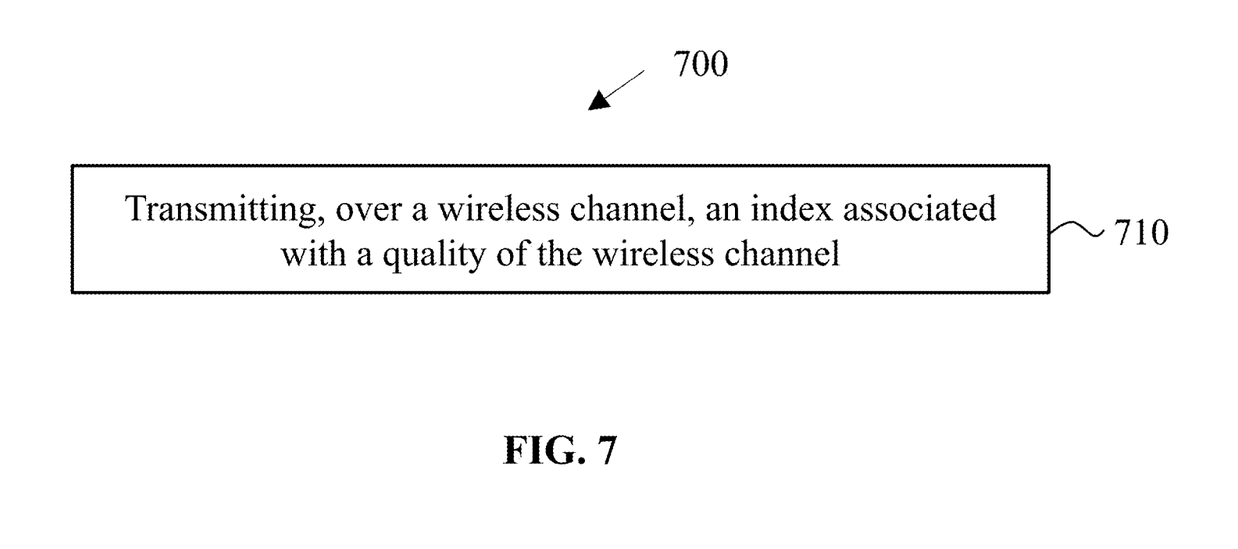
FIG. 7 shows an example of a wireless communication method for the transmission and reception of CQI information.

FIG. 7 shows an example of a wireless communication method 700, which may be implemented at a wireless device, for the transmission and reception of CQI information over a physical channel. The method 700 includes, at step 710, transmitting, over the uplink physical channel, an index associated with a quality of the downlink physical channel, where the index corresponds to an entry in a parameter table, of a parameter table set, that includes a modulation scheme, a code rate and an efficiency associated with the index, and where one or more parameter tables of the parameter table set comprise at least three entries comprising code rates having values less than or equal to 120/1024. In some embodiments, the uplink physical channel is a physical channel from the wireless device to a network node, and the downlink physical channel is a physical channel from the network node to the wireless device.

The method 700 may further include the step of performing channel estimation, and selecting the index based on the channel estimation. In some embodiments, the index may be based on a fidelity of the channel estimate. In other embodiments, statistical measures of the channel estimate may be used to determine the index.

The method 700 may further include the step of receiving a plurality of data blocks, where contents of the plurality of data blocks are generated using a block size and a modulation scheme, and where the block size and the modulation scheme correspond to an entry associated with the index in the at least one parameter table.

The method 700 may further include the step of decoding each of the plurality of data blocks, such that a block error rate (BLER) resulting from the decoding is less than or equal to a predetermined threshold value. In some embodiments, the BLER that meets the predetermined threshold value is after one-shot decoding. In other embodiments, the BLER that meets the predetermined threshold value is after iterative decoding of the plurality of data blocks.

Figure 8:
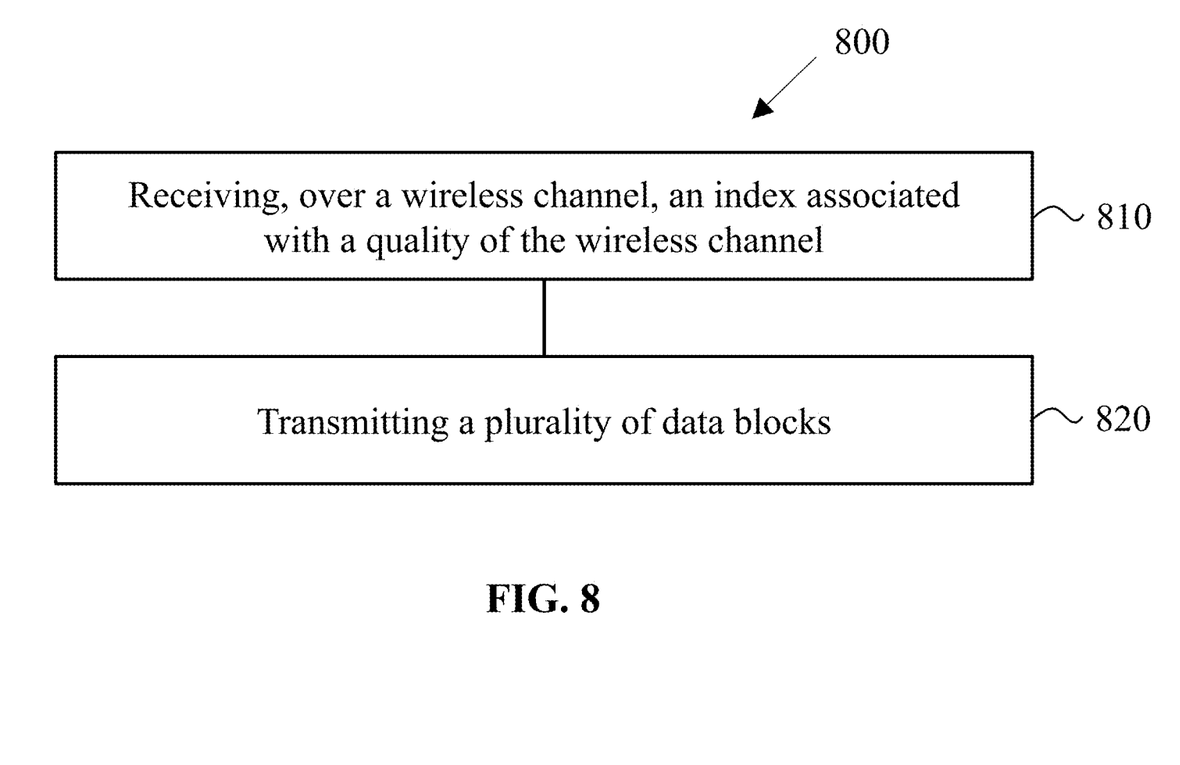
FIG. 8 shows another example of a wireless communication method for the transmission and reception of CQI information.

FIG. 8 shows another example of a wireless communication method 800, which may be implemented at a network node, for the transmission and reception of CQI information over a physical channel. The method 800 includes, at step 810, receiving, over the uplink physical channel, an index associated with a quality of the downlink physical channel. In some embodiments, the uplink physical channel is a physical channel from the wireless device to a network node, and the downlink physical channel is a physical channel from the network node to the wireless device.

The method 800 includes, at step 820, transmitting a plurality of data blocks, where contents of the plurality of data blocks are generated using a block size and a modulation scheme, where the block size and the modulation scheme correspond to an entry associated with the index in a parameter table, of a parameter table set, where the entry further includes an efficiency, and where one or more parameter tables of the parameter table set comprise at least three entries comprising code rates having values less than or equal to 120/1024.

Embodiments of the disclosed technology may implement methods 700 or 800, and may include at least one CQI table that is described in the context of Example Embodiments One through Five.

For example, the modulation scheme for each entry in at least one parameter table may be Quadrature Phase Shift Keying (QPSK). Furthermore, the code rate corresponding to a largest index in the at least one parameter table may be 78/1024, and the code rate corresponding to a smallest index in the at least one parameter table may be between 30/1024 and 40/1024.

For example, the modulation scheme for each entry in at least one parameter table may be Quadrature Phase Shift Keying (QPSK). Furthermore, the code rate corresponding to a largest index of the at least one parameter table may be 120/1024, and the code rate corresponding to a smallest index of the at least one parameter table may be 78/1024.

For example, a first parameter table of the parameter table set may be a predetermined parameter table, where each entry in the first parameter table further includes an efficiency associated with the index.

For example, a second parameter table may be defined based on the first parameter table.

In an example, each entry in the second parameter table may include a modulation scheme that is identical to the modulation scheme associated with the corresponding entry in the first parameter table, and may further include a code rate that differs from the code rate associated with the corresponding entry in the first parameter table by a predetermined value.

In another example, each entry in the second parameter table may include a modulation scheme that is identical to the modulation scheme associated with the corresponding entry in the first parameter table, and may further include an efficiency that differs from the efficiency associated with the corresponding entry in the first parameter table by a predetermined value.

For example, the predetermined values described above may be based on the modulation order of the modulation scheme.

For example, the predetermined value may be offset by a value greater than or equal to −2/1024 and less than or equal to 2/1024.

For example, the modulation scheme corresponding to a largest index in at least one parameter table may be 64-QAM.

For example, the code rate corresponding to the largest index in the at least one parameter table may be either 666/1024 or 873/1024.

For example, when two CQI tables are being used to meet two different BLER requirements, a substantial number of entries between the two tables may be identical. In other words, modulation scheme and code rate combinations that are identical will be assigned the same CQI index.

In some embodiments, the parameter table set may include a table, which has one or more entries associated with modulation schemes that are identical to the modulation schemes corresponding to one or more entries in a reference table (e.g. eMBB CQI table, which is not part of the parameter table set). In an example, the table of the parameter table set may include code rates that are offset from the code rates in the corresponding entries in the reference table (as described in Example 2.1). In another example, the table of the parameter table set may include efficiencies that are offset from the efficiencies in the corresponding entries in the reference table set (as described in Example 2.2). The efficiencies and code rates for the parameter tables may be computed as described in this document.

Figure 9:
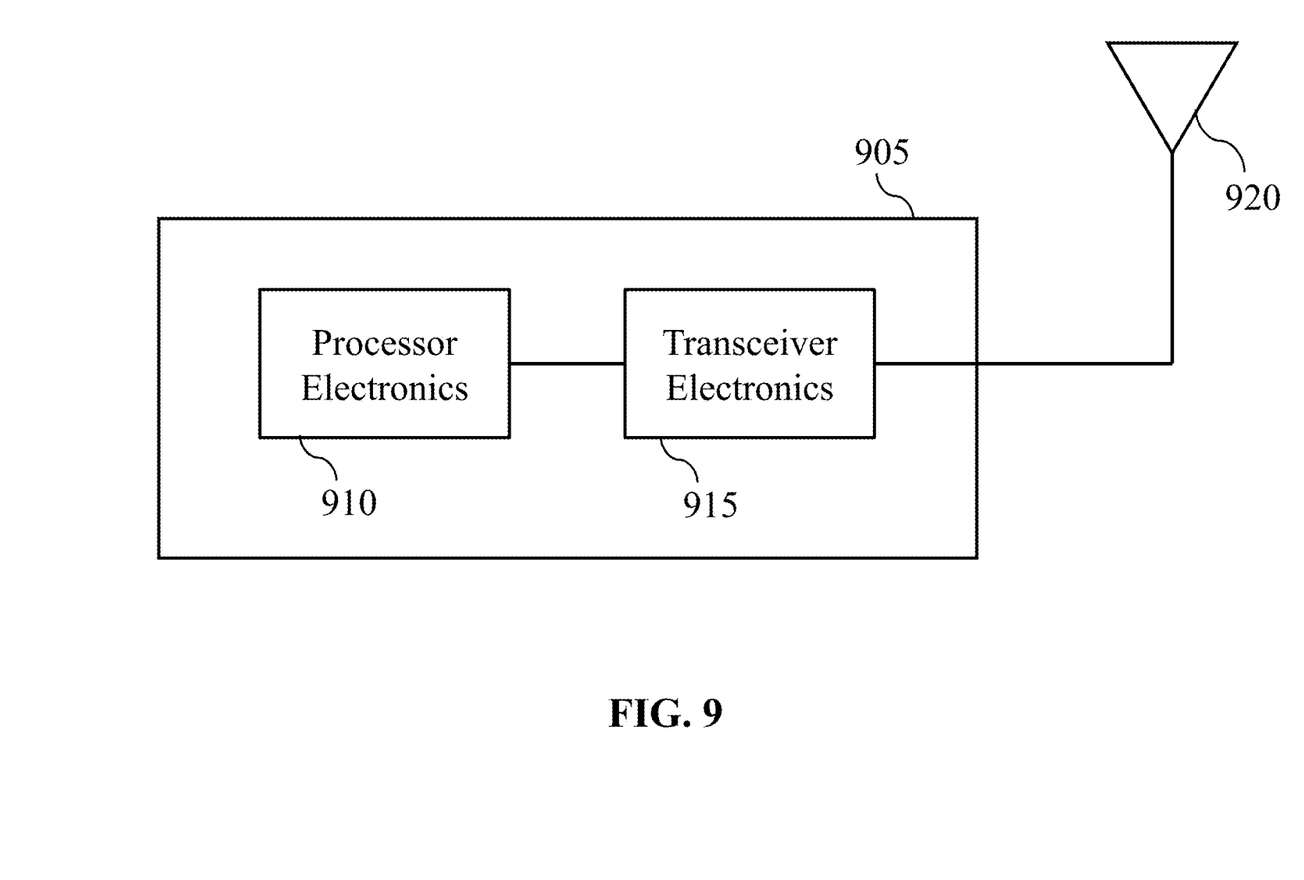
FIG. 9 is a block diagram representation of a portion of an apparatus that may implement a method or technique described in this patent document.

FIG. 9 is a block diagram representation of a portion of an apparatus, in accordance with some embodiments of the presently disclosed technology. An apparatus 905, such as a base station or a wireless device, can include processor electronics 910 such as a microprocessor that implements one or more of the techniques presented in this document. The apparatus 905 can include transceiver electronics 915 to send and/or receive wireless signals over one or more communication interfaces such as antenna(s) 920. The apparatus 905 can include other communication interfaces for transmitting and receiving data. Apparatus 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions are implemented using the radio station 905, including methods 700 and 800 described in the present document.

It is intended that the specification, together with the drawings, be considered exemplary only, where exemplary means an example and, unless otherwise stated, does not imply an ideal or a preferred embodiment. Additionally, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, implemented at a wireless device, the method comprising:
   transmitting, over a physical channel, an index associated with a quality of the physical channel,
   wherein the transmitting is over the physical channel from the wireless device to a network node, wherein the quality of the physical channel is for the physical channel from the network node to the wireless device, wherein the index corresponds to an entry in a parameter table of a parameter table set, wherein the entry comprises a modulation scheme, a code rate and an efficiency associated with the index, wherein one or more parameter tables of the parameter table set comprise at least three entries comprising code rates equal to 30/1024, 50/1024, and 78/1024, wherein the modulation scheme for the at least three entries is Quadrature Phase Shift Keying (QPSK) and wherein the parameter table set comprises one or two parameter tables.

2. The method of claim 1, wherein the modulation scheme for a subset of entries in at least one parameter table of the parameter table set is QPSK, and wherein the subset of entries comprises code rates R1, r1, r2, ..., rn and R2, wherein n is in a set {0, 1, 2, 4, 5}, wherein R1<r1<r2 < ... <rn<R2, and wherein R2<120/1024.

3. The method of claim 2, wherein 30/1024≤R1≤40/1024 and R2=78/1024.

4. The method of claim 1, wherein one or more entries in a first parameter table of the parameter table set comprises a modulation scheme that is identical to the modulation scheme associated with the corresponding one or more entries in a second parameter table of the parameter table set.

5. The method of claim 4, wherein the one or more entries in the second parameter table comprises a code rate or an efficiency that differs from the code rate or the efficiency, respectively, associated with the corresponding entry in the first parameter table by a predetermined value.

6. The method of claim 5, wherein the predetermined value is offset by a value greater than or equal to −2/1024 and less than or equal to 2/1024.

7. The method of claim 4, wherein the modulation scheme and the code rate of the first parameter table of the parameter table set is defined as:

| Modulation | Code rate × 1024 |
|---|---|
| QPSK | 78 |
| QPSK | 120 |
| QPSK | 193 |
| QPSK | 308 |
| QPSK | 449 |
| QPSK | 602 |
| 16QAM | 378 |
| 16QAM | 490 |
| 16QAM | 616 |
| 64QAM | 466 |
| 64QAM | 567 |
| 64QAM | 666 |
| 64QAM | 772 |
| 64QAM | 873 |
| 64QAM | 948. |

8. The method of claim 1, wherein one or more entries in a parameter table of the parameter table set comprises a modulation scheme that is identical to the modulation scheme associated with the corresponding one or more entries in a reference parameter table, wherein the one or more entries in the parameter table comprises a code rate that differs from the code rate associated with the corresponding entry in the reference parameter table by a first predetermined value, or wherein the one or more entries in the parameter table comprises an efficiency that differs from the efficiency associated with the corresponding entry in the reference parameter table by a second predetermined value.

9. The method of claim 1, wherein the modulation scheme corresponding to a maximum efficiency in at least one parameter table of the parameter table set is 64-QAM (Quadrature Amplitude Modulation).

10. The method of claim 9, wherein the code rate corresponding to the maximum efficiency in the at least one parameter table is 666/1024 or 873/1024.

11. The method of claim 1, wherein a first parameter table and a second parameter table of the parameter table set comprise an identical set of entries, wherein the first parameter table is associated with a first block error rate requirement, wherein the second parameter table is associated with a second block error rate requirement.

12. A method for wireless communication, implemented at a network node, the method comprising:

receiving, over a physical channel, an index associated with a quality of the physical channel; and transmitting a plurality of data blocks, wherein the receiving is over the physical channel from a wireless device to the network node, wherein the quality of the physical channel is for the physical channel from the network node to the wireless device, wherein contents of the plurality of data blocks are encoded using a code rate and modulated using a modulation scheme, wherein the code rate and the modulation scheme are selected from an entry in a parameter table of a parameter table set corresponding to the index, and wherein the entry further comprises an efficiency, wherein one or more parameter tables of the parameter table set comprise at least three entries comprising code rates equal to 30/1024, 50/1024, and 78/1024, and wherein the modulation scheme for the at least three entries is Quadrature Phase Shift Keying (QPSK) and wherein the parameter table set comprises one or two parameter tables.

13. The method of claim 12, wherein the modulation scheme for a subset of entries in at least one parameter table of the parameter table set is QPSK, and wherein the subset of entries comprises code rates R1, r1, r2, ..., rn and R2, wherein n is in a set {0, 1, 2, 4, 5}, wherein R1<r1<r2 < ... <rn<R2, and wherein R2<120/1024.

14. The method of claim 13, wherein 30/1024≤R1≤40/1024 and R2=78/1024.

15. The method of claim 12, wherein one or more entries in a first parameter table of the parameter table set comprises a modulation scheme that is identical to the modulation scheme associated with the corresponding one or more entries in a second parameter table of the parameter table set.

16. The method of claim 15, wherein the one or more entries in the second parameter table comprises a code rate or an efficiency that differs from the code rate or the efficiency, respectively, associated with the corresponding entry in the first parameter table by a predetermined value.

17. The method of claim 16, wherein the predetermined value is offset by a value greater than or equal to −2/1024 and less than or equal to 2/1024.

18. The method of claim 1, wherein the wireless device is a user equipment operating in a mobile communication network, wherein the index associated with the quality of the physical channel is a channel quality indicator (CQI), and wherein the mobile communication network supports a (New Radio) NR-mMTC (Massive Machine-Type Communications) service or a (New Radio) NR-URLLC (Ultra-Reliable Low-Latency Communication) service.

19. A wireless communication apparatus, comprising:
a processor that is configured to perform a method, the processor configured to:
  transmit, over a physical channel, an index associated with a quality of the physical channel,
    wherein the transmit is over the physical channel from a wireless device to a network node,
    wherein the quality of the physical channel is for the physical channel from the network node to the wireless device,
    wherein the index corresponds to an entry in a parameter table of a parameter table set, wherein the entry comprises a modulation scheme, a code rate and an efficiency associated with the index,
    wherein one or more parameter tables of the parameter table set comprise at least three entries comprising code rates equal to 30/1024, 50/1024, and 78/1024,
    wherein the modulation scheme for the at least three entries is Quadrature Phase Shift Keying (QPSK), and
    wherein the parameter table set comprises one or two parameter tables.

20. The wireless communication apparatus of claim 19, wherein one or more entries in a first parameter table of the parameter table set comprises a modulation scheme that is identical to the modulation scheme associated with the corresponding one or more entries in a second parameter table of the parameter table set.

21. A wireless communication apparatus, comprising:
a processor configured to implement a method, the processor configured to:
  receive, over a physical channel, an index associated with a quality of the physical channel; and
  transmit a plurality of data blocks,
    wherein the receiving is over the physical channel from a wireless device to a network node, wherein the quality of the physical channel is for the physical channel from the network node to the wireless device,
    wherein contents of the plurality of data blocks are encoded using a code rate and modulated using a modulation scheme, wherein the code rate and the modulation scheme are selected from an entry in a parameter table of a parameter table set corresponding to the index, and wherein the entry further comprises an efficiency,
    wherein one or more parameter tables of the parameter table set comprise at least three entries comprising code rates equal to 30/1024, 50/1024, and 78/1024, and wherein the modulation scheme for the at least three entries is Quadrature Phase Shift Keying (QPSK), and
  wherein the parameter table set comprises one or two parameter tables.

22. The wireless communication apparatus of claim 21, wherein one or more entries in a first parameter table of the parameter table set comprises a modulation scheme that is identical to the modulation scheme associated with the corresponding one or more entries in a second parameter table of the parameter table set.

* * * * *

UNITED STATES PATENT AND TRADEMARK OFFICE
CERTIFICATE OF CORRECTION

PATENT NO. : 11,496,239 B2
APPLICATION NO. : 17/038683
DATED : November 8, 2022
INVENTOR(S) : Mengzhu Chen et al.

It is certified that error appears in the above-identified patent and that said Letters Patent is hereby corrected as shown below:

In the Claims

In Columns 10, Claim 1, Lines 62-67 and Column 11, Claim 1, Lines 1-3, please delete:
"A method for wireless communication, implemented at a wireless device, the method comprising: transmitting, over a physical channel, an index associated with a quality of the physical channel, wherein the transmitting is over the physical channel from the wireless device to a network node, wherein the quality of the physical channel is for the physical channel from the network node to the wireless device,"
And insert:
--A method for wireless communication, implemented at a wireless device, the method comprising: transmitting, over a physical channel, an index associated with a quality of one physical channel, wherein the transmitting is over the physical channel from the wireless device to a network node, wherein the quality of the one physical channel is for the one physical channel from the network node to the wireless device,--

In Column 12, Claim 12, Lines 15-23, please delete:
"A method for wireless communication, implemented at a network node, the method comprising: receiving, over a physical channel, an index associated with a quality of the physical channel; and transmitting a plurality of data blocks,
wherein the receiving is over the physical channel from a wireless device to the network node, wherein the quality of the physical channel is for the physical channel from the network node to the wireless device,"
And insert:
--A method for wireless communication, implemented at a network node, the method comprising: receiving, over a physical channel, an index associated with a quality of one physical channel; and transmitting a plurality of data blocks,
wherein the receiving is over the physical channel from a wireless device to the network node, wherein the quality of the one physical channel is for the one physical channel from the network node to the wireless device,--

Signed and Sealed this
Twenty-fifth Day of February, 2025

Coke Morgan Stewart
*Acting Director of the United States Patent and Trademark Office*

CERTIFICATE OF CORRECTION (continued)
U.S. Pat. No. 11,496,239 B2

In Column 13, Claim 19, Lines 1-10, please delete:
"A wireless communication apparatus, comprising: a processor that is configured to perform a method, the processor configured to:
transmit, over a physical channel, an index associated with a quality of the physical channel, wherein the transmit is over the physical channel from a wireless device to a network node, wherein the quality of the physical channel is for the physical channel from the network node to the wireless device,"
And insert:
--A wireless communication apparatus, comprising: a processor that is configured to perform a method, the processor configured to:
transmit, over a physical channel, an index associated with a quality of one physical channel, wherein the transmit is over the physical channel from a wireless device to a network node, wherein the quality of the one physical channel is for the one physical channel from the network node to the wireless device,--

In Column 13, Claim 21, Lines 30-32, and Column 14, Claim 21, Lines 1-8, please delete:
"A wireless communication apparatus, comprising:
a processor configured to implement a method, the processor configured to:
receive, over a physical channel, an index associated with a quality of the physical channel; and transmit a plurality of data blocks,
wherein the receiving is over the physical channel from a wireless device to a network node, wherein the quality of the physical channel is for the physical channel from the network node to the wireless device,"
And insert:
--A wireless communication apparatus, comprising:
a processor configured to implement a method, the processor configured to:
receive, over a physical channel, an index associated with a quality of one physical channel; and transmit a plurality of data blocks,
wherein the receive is over the physical channel from a wireless device to a network node, wherein the quality of the one physical channel is for the one physical channel from the network node to the wireless device,--